United States Patent [19]

Kliger

[11] Patent Number: 4,584,584
[45] Date of Patent: Apr. 22, 1986

[54] METHOD OF MEASURING RANGE AND ALTITUDE

[75] Inventor: Isaac E. Kliger, Lexington, Mass.

[73] Assignee: Raytheon Company, Lexington, Mass.

[21] Appl. No.: 477,034

[22] Filed: Mar. 21, 1983

[51] Int. Cl.$^4$ ................................................ G01S 3/02
[52] U.S. Cl. .................... 343/451; 343/12 A; 343/458
[58] Field of Search ............... 343/12 A, 12 R, 451, 343/458

[56] References Cited

U.S. PATENT DOCUMENTS

| | | | |
|---|---|---|---|
| 2,837,738 | 6/1958 | Van Valkenburgh | 343/12 R |
| 3,172,108 | 5/1965 | McClure | 343/451 |
| 3,181,144 | 4/1965 | Morrel et al. | 343/12 R |
| 3,313,928 | 4/1967 | Harpell | 343/12 R |
| 3,812,493 | 5/1974 | Afendykiw et al. | 343/12 R |
| 3,896,442 | 7/1975 | Heminway et al. | 343/18 |
| 3,982,246 | 9/1976 | Lubar | 343/451 |
| 4,370,656 | 1/1983 | Frazier et al. | 343/458 |
| 4,445,120 | 4/1984 | Rosenthal | 343/451 X |

Primary Examiner—Theodore M. Blum
Assistant Examiner—John B. Sotomayor
Attorney, Agent, or Firm—Philip J. McFarland; Richard M. Sharkansky

[57] ABSTRACT

A method is disclosed to measure the range and altitude of a radio frequency signal jamming source carried on an airborne platform, signals from such source traveling to a pair of airborne observation points over a direct path and an indirect path, such method including the steps of, before operation, assuming different altitudes for each one of the airborne observation points, calculating and storing sets of numbers representing lines of position characterizing selected values of the difference, dR, between the lengths of the direct and indirect paths, and then, in operation, measuring dR to derive an address indicating the particular one of the stored sets of numbers describing the actual line of position from each observation point to the signal source, triangulating to determine the actual location of the signal source on the actual line of position and displaying the range and altitude of the signal source.

4 Claims, 6 Drawing Figures

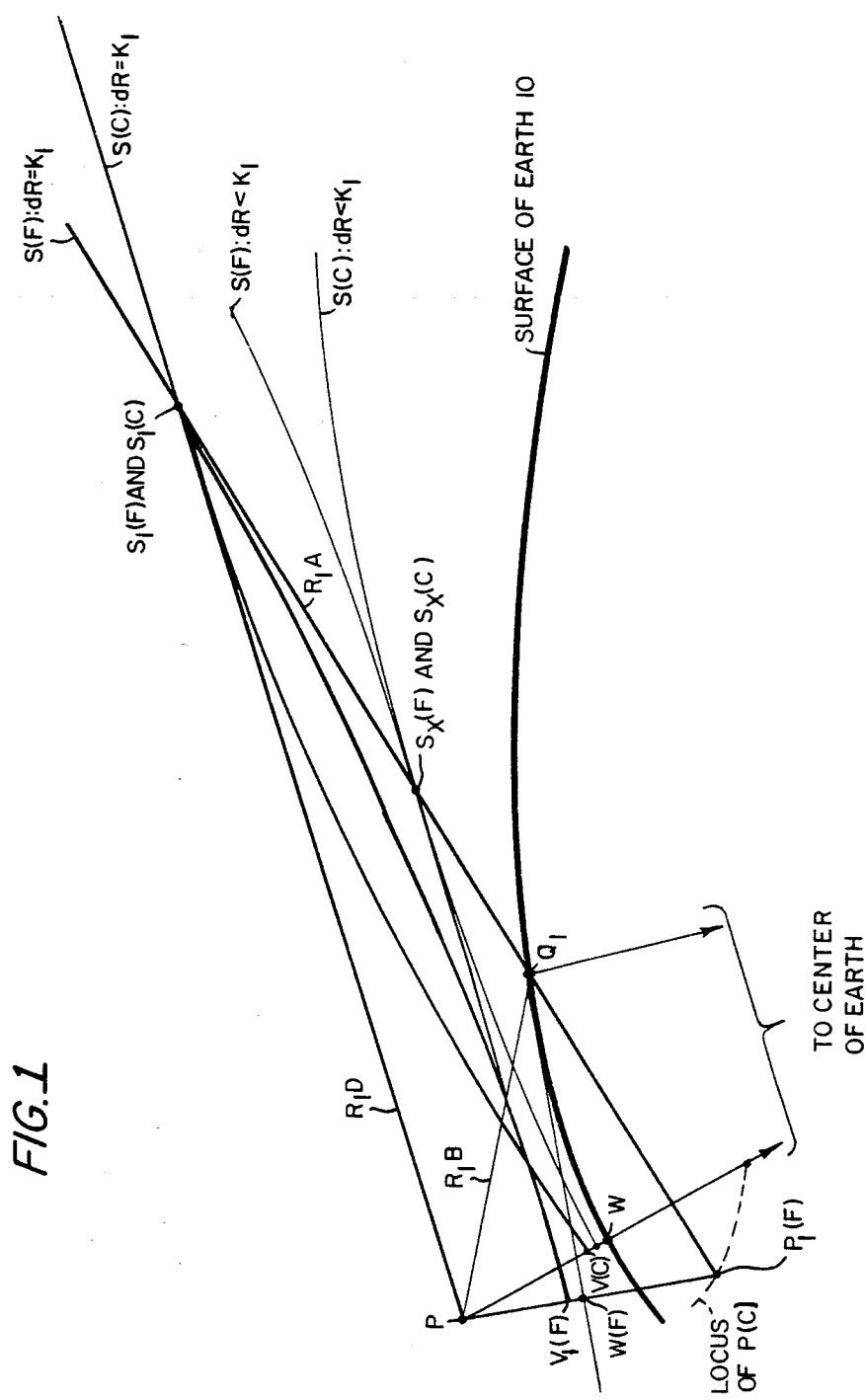

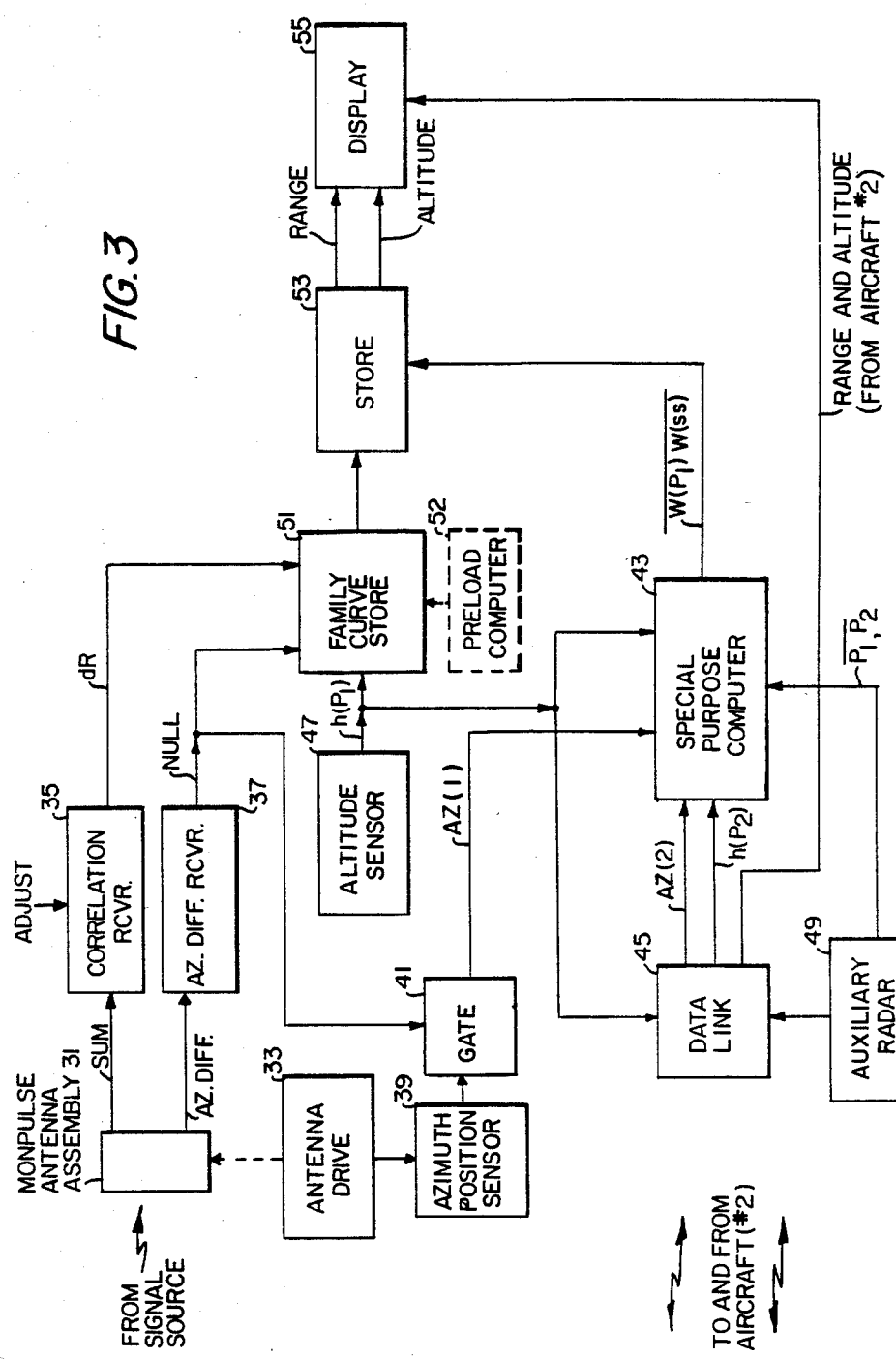

METHOD OF MEASURING RANGE AND ALTITUDE

BACKGROUND OF THE INVENTION

This invention pertains generally to airborne radar systems and more particularly to a method for enabling the receiver in such a system to be used to measure the range of a signal source.

It is known that the range of a signal source from an airborne radar may be determined with some degree of accuracy by measuring the differential time delay between signals traveling on a direct path between the airborne radar and the signal source and signals traveling on an indirect path (ground reflected) between the airborne radar and the signal source and the angle between the direct and indirect paths at such radar. Although it is relatively easy to apply known correlation techniques to measure the differential time delay, it is difficult to measure the angle between the direct and indirect signal paths. The difficulty derives from the fact that that angle is, if the signal source is at an appreciable range, relatively small and any error in measurement has an inordinate effect on the accuracy of the determined range.

It is also known that the range of a signal source may be determined by applying the well-known technique of triangulation. Thus, with the distance between two aircraft serving as a base for triangulation, azimuthal angles between each aircraft and the signal source may be measured to provide the necessary information to determine the range between the signal source and either aircraft. However, triangulation is not effective when more than one signal source is present because so-called "phantom" responses then exist so there is no way to be sure that the azimuthal angles are referenced to the same signal source. Further, even when there is a single signal source, triangulation does not uniquely define the position of an airborne signal source; all that is defined is a line in space corresponding to the intersection between the two vertical planes defined by the two azimuthal measurements. The signal source then is located somewhere on such line in space.

Another known way of passively measuring range between an airborne radar and a signal source requires that radars on two aircraft be operated in a correlation mode to measure the time delay (range difference) between the direct path signals received by each aircraft. In order to implement such a system, each of the two aircraft must also be equipped with a wideband communication link capable of relaying direct path signals between aircraft.

SUMMARY OF THE INVENTION

With the foregoing background of the invention in mind it is therefore a primary object of this invention to provide a method for determining the range to a signal source by using directional signals received by an airborne receiver without requiring an elevation angle measurement.

It is another object of this invention to provide a method for uniquely determining the range to each one of a plurality of distant signal sources using signals received by an airborne receiver.

It is yet another object of this invention to provide a method for determining the range of a distant signal source without requiring any change in the antenna of an airborne receiver.

The foregoing and other objects of this invention are generally attained by utilizing receivers on a pair of aircraft at measured locations in space, each of which receivers passively measures the differential time delay between the signals received on a direct and an indirect path from a single signal source and the azimuth angle of such source. With the measured altitude and time delay (or range difference, dR) as an address, a precomputed and stored line of position relative to each aircraft is extracted from a store and the position of the signal source along such line of position is determined by triangulation. In the situation when a plurality of signal sources on spatially separated platforms is received, a pair of intersecting lines of position is defined for each signal source; except in rare cases, each such pair of intersecting lines of position is uniquely related to a different one of the signal sources.

BRIEF DESCRIPTION OF THE DRAWINGS

The foregoing features of this invention, as well as the invention itself, may be more fully understood from the following detailed description read together with the accompanying drawings, wherein:

FIG. 1 is a simplified vertical cross-section illustrating the difference between the lines of position derived by assuming a flat earth and the lines of position derived by assuming a curved earth, all such lines being derived by measuring the difference in path lengths between reflected and direct rays from a source to a single receiving point;

FIG. 3 is a block diagram, somewhat simplified, showing how the method here contemplated may be carried out.

DESCRIPTION OF THE PREFERRED EMBODIMENTS

Referring now to FIG. 1, an airborne source (not shown) of radio frequency signals is shown to be transmitting signals from an arbitrarily selected position designated "$S_1(F)$ and $S_1(C)$" to a receiver (not shown) at a position above the surface of the earth 10 designated "P". Such signals pass over a direct path, $R_{1D}$, and an indirect path made up of segments designated $R_{1A}$ and $R_{1B}$. The segments $R_{1A}$ and $R_{1B}$ are the result of reflection of radio frequency energy from a point $Q_1$ on the surface of the earth 10. Neglecting any beam spreading and any effect of refraction on the radio frequency energy, the direct path $R_{1D}$ and the segments $R_{1A}$, $R_{1B}$ of the indirect path are shown as straight lines. The tangent to the surface of the earth 10 at the point $Q_1$ is shown as tangent $T_1$. The image of position P, assuming the tangent $T_1$ to be the surface of the earth, then is at the point $P_1(F)$. Further, it may be seen that, because the tangent $T_1$ is the perpendicular bisector of the line $\overline{PP_1(F)}$, the triangle $Q_1PP_1(F)$ is an isosceles triangle. Side $\overline{Q_1P}$ (or $R_1B$) then is equal to side $\overline{Q_1P_1(F)}$.

It will now be evident to one of skill in the art that the difference (referred to sometimes as the difference "dR" or the difference "$dR_1$") between the direct ($R_1D$) and indirect paths ($R_1A$ and $R_1B$) may be measured at the position P by utilizing any known correlation technique, as, for example, a technique such as is shown in U.S. Pat. No. 3,896,442, issued on July 22, 1975 to J. R. Heminway et al and assigned through mesne assignment to the U.S. Government. Briefly, to determine dR (or $dR_1$) correlation the signal received at each instant in time is delayed until comparison with a later received signal produces a correlation peak. The amount of such measured delay multiplied by the speed of light then is a measurement of dR (or $dR_1$). If, then, dR is a constant $K_1$ and the point of reflection is assumed to fall at the point $Q_1$ on the tangent $T_1$, the curve $S(F):dR=K_1$ is the locus of all possible positions of the source (not shown) at the illustrated bearing from position P. Curve $S(F):dR=K_1$ is, obviously, a hyperbola with its vertex here at $V_1(F)$ and foci at P and $P_1(F)$ along principal axis $\overline{PP_1(F)}$. The distance $\overline{W(F) \ V_1(F)}$ then equals $dR_1/2$.

Figure 1A:
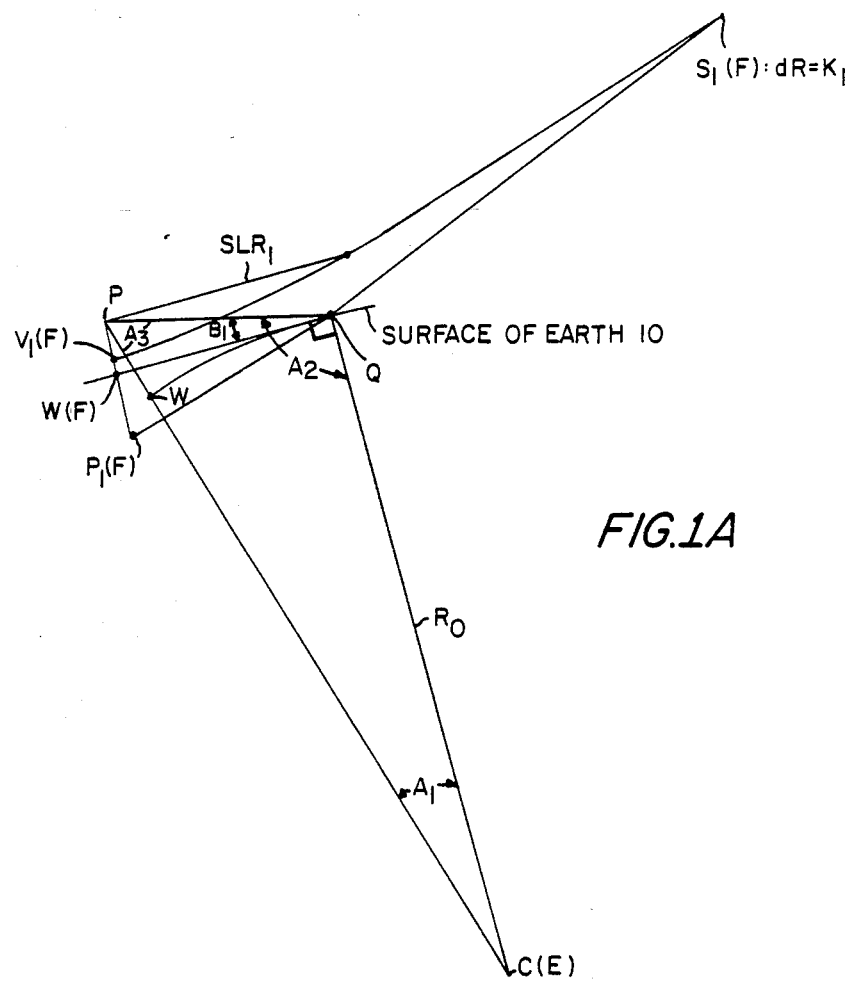
FIGS. 1A, 1B, 1C are sketches illustrating in greater detail the rationale of different parts of FIG. 1.

A moment's thought will now make it clear that if only dR is changed (say, as shown, to some constant less than $K_1$) the locus of all possible points meeting the changed value of dR is also a hyperbola (such as the curve $S_X(F); dR<K_1$). In any event, as shown in FIG. 1A, there the known and assumed parameters are sufficient to allow calculation of a family of hyperbolas representative of "curves of constant dR" for any given altitude of the position P above the tangent $T_1$ and for any given point of reflection. Thus, in FIG. 1A, let $A_1$ be any angle between 0° and the angle formed at the center of the earth between the local vertical through point P and the radius of the earth at the point of reflection, Q. It is evident then that the law of cosines may be applied to the triangle P,Q,C(E) to calculate the length of the side $\overline{PQ}$. The law of sines may then be applied to calculate the angle $A_2$. The half vertex angle $B_1$ of the triangle $PQP_1(F)$ then equals $(A_2-90°)$, the length $\overline{PP_1(F)}$ equals $2 \overline{PQ} \sin B_1$ and the length $\overline{PW(F)}$ equals $\overline{PQ} \sin B_1$. The point $V_1(F)$, which point is the vertex of the hyperbola for which the assumed $dR_1$ is a constant, is at a distance from point P of $(\overline{PQ} \sin B_1 - dR_1/2)$. Applying the well known hyperbolic equations to the foregoing it may be shown that the eccentricity, e, of the hyperbola equals $(2\overline{PQ} \sin B_1/dR_1)$ and the length of the semilatus rectum, SLR, equals $(dR_1/2)((2\overline{PQ} \sin B_1/Dr_1)^2 - 1)$. The polar equation (referred to point P as the origin) of the hyperbola S then is $$R = (dR_1/2)((2\overline{PQ} \sin B_1/dR_1)^2 - 1)/(1 - 2\overline{PQ} \sin B_1/dR) \cos X \quad \text{Eq. (1)}$$

where X is the angle between the principal axis and the radius vector to any point on the hyperbola. It follows then that with the distance $\overline{PP_1(F)}$ fixed (meaning that the altitude $\overline{PW}$ is a predetermined constant), a family of hyperbolas may be calculated by assuming different values of dR and X. Further, by changing the altitude $\overline{PW}$ different families of hyperbolas may be calculated.

In order to compensate for the curvature of the surface of the earth 10 (FIG. 1), the procedure just described for producing families of hyperbolas must be modified. Specifically, because the position of P(C) (FIG. 1) changes as the angle $A_1$ (FIG. 1A) is changed, it is necessary to calculate the proper value of $\overline{PQ} \sin B_1$ for each value of the angle $A_1$ while each hyperbola in each family is being calculated.

Figure 1B:
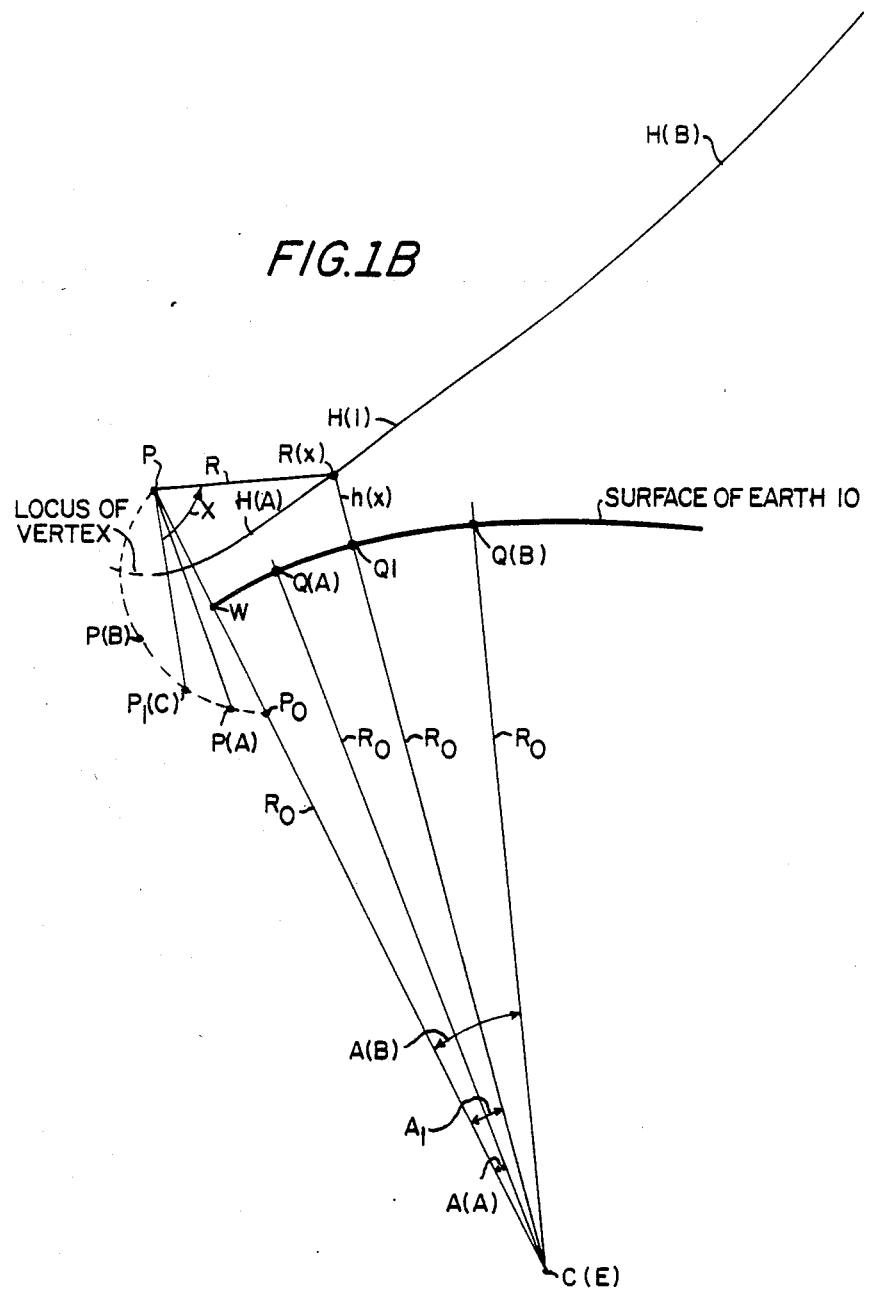
Figure 1C:
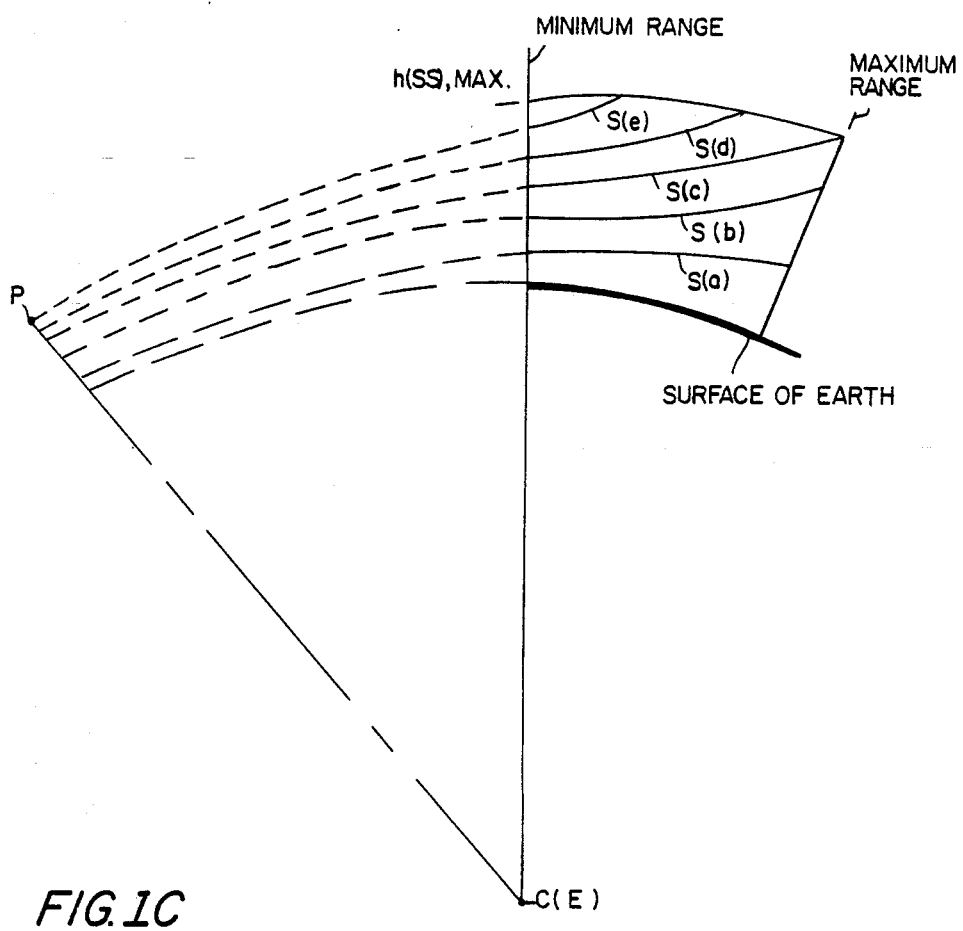

Thus, as shown in FIG. 1B, for a given height $\overline{PW}$ above the surface of the earth 10 and a given dR, the image of the point P is at $P_O(c)$ when the angle A equals zero and, as the angle A is changed successively to values of A(A), $A_1$ and AB, the image of the point P changes to positions $P_A$, $P_1(C)$, $P_{(B)}$. In addition, the locus of the vertex changes as indicated. For each value of the angle A, an appropriate section of a hyperbola (such as the sections marked $H_A$, $H_1$, $H_B$) may be calculated following the method described hereinbefore. The resulting smoothed, or faired curve, then approximates the curve $S(C):dR=K_1$ of FIG. 1. By repeating the foregoing with other assumed values of dR, a family of curves may be attained. The result then are curves such as $S(C):dR=K_1$ and $S_X(C):dR<K_1$ shown in FIG. 1.

Although the calculations to obtain the families of curves (such as that having $S(C):dR=K_1$ and $S(C):dR<k_1$) may be rather tedious, the contemplated method requires that the calculations be carried out but once before operation. Further, if signal sources carried by aircraft at long range from an observation point are to be measured, only a limited number of curves (as, for example, curves S(a) through S(e) of FIG. 1C) in each family need be calculated because the maximum height hS5 (MAX) of aircraft is restricted. Further, for convenience in operation, the curves are expressed as sets of pairs of numbers indicating, respectively, range and altitude of a signal source. As shown in FIG. 1B, triangle $P,C(E),R_X$ may be solved by application of the law of sines ultimately to allow the height $h_X$ to be calculated for each point along each section of hyperbola. The curves, or more precisely, sets of pairs of numbers indicating range and altitude of preselected points on each curve, are stored in a conventional memory addressed by $\overline{PW}$ (FIG. 1) and dR. That is to say, in operation, different families of curves are selected in accordance with the altitude of the aircraft and an individual curve in the selected family is selected in accordance with dR. To put it another way, in operation it is necessary only to measure the altitude of the point P and the value of dR to determine the proper line of position of a signal source (not shown).

Figure 2:
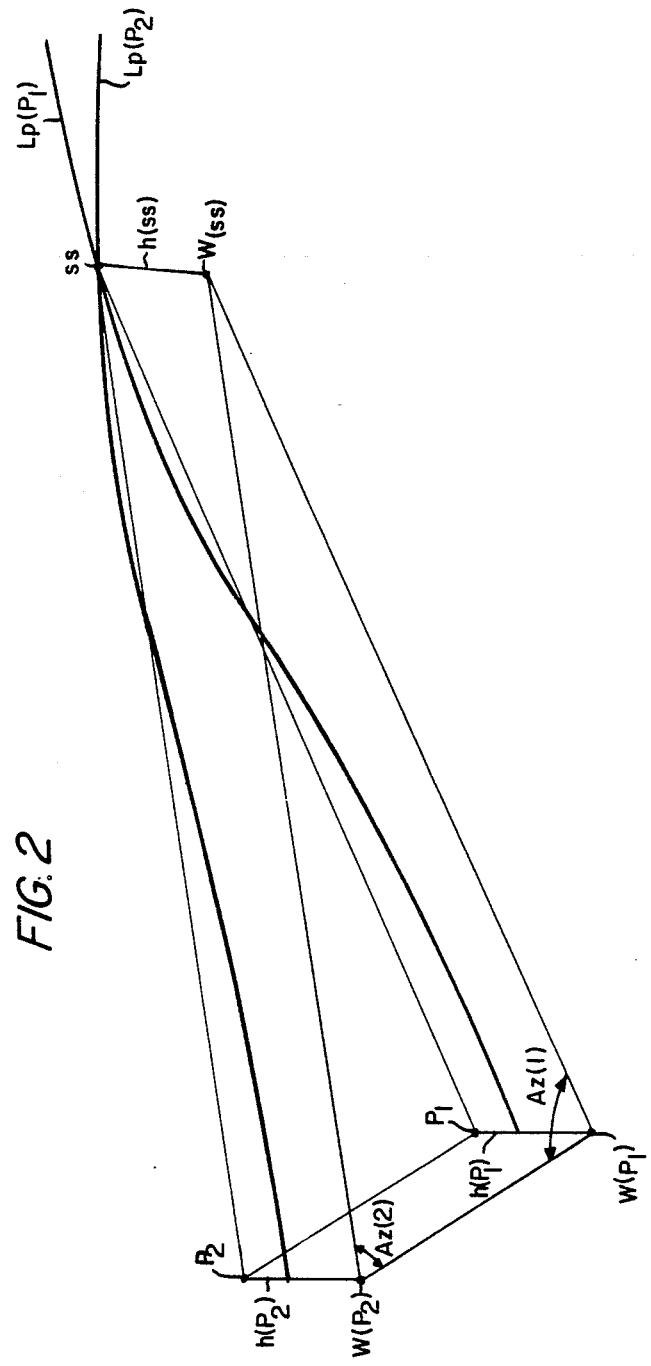
FIG. 2 is a sketch showing how observations from two spatially separate points may be used to determine the location of a signal source.

In order to determine the location of a signal source, ss, along a selected line of position, $L_p(P_1)$ it is contemplated here that (as shown in FIG. 2) a well known triangulation technique be employed. Thus, as shown in FIG. 2, signals from the signal source ss at a height h(ss) are received at points $P_1$, $P_2$, each as shown at a height $h(P_1)$, $h(P_2)$ and the azimuth angles Az(1), Az(2) are measured. The distance between points $P_1$ and $P_2$ is measured in any convenient manner, as, for example, by an auxiliary radar (not shown) at both points $P_1$, $P_2$ and the heights of both points $P_1$, $P_2$ is provided so that the measured values Az(1), Az(2), $h(P_1)$ and $h(P_2)$ may be interchanged. It is evident then that the length of the base, $W(P_1)$, $W(P_2)$ of the triangle $\overline{W(P_1), W(P_2), W(ss)}$ may be calculated to allow solution of the triangle W(ss), $W(P_1)$, $W(P_2)$ by application of the law of sines. The height h(ss) then may be deemed to approximate the intersection of a first range sphere having point $P_1$ as its center and line $W(P_1) W(ss)$ as its radius and a second range sphere having point P2 as its center and line $\overline{W(P_2) \ W(ss)}$ as its radius. With the range along the selected line of position known, the altitude of the signal source (not shown) is the second number in the pair of numbers wherein the first number is range.

It will now be observed that if the curve $L_p(P_2)$ is selected and the range and altitude of the signal source (not shown) are determined, the calculated position of the signal source (not shown) is, if there is a single signal source, the same as calculated using curve $L_p(P_1)$. However, if more than one signal source is present, the correlation at points $P_1$ and $P_2$ may not be effected from signals from the same signal source. In such case, the correlation of direct and indirect path lengths, i.e. the measurement of dR at either $P_1$ or $P_2$, may be adjusted to effect the requisite coincidence. It follows, then, that if more than one signal source is present, e.g. if, for example, a number of jammers carried on different aircraft are present, adjustment may be made to determine the range and altitude of each such aircraft.

Referring now to FIG. 3, apparatus carried on an aircraft to carry out the contemplated method is shown. Needless to say, to carry out the triangulation steps of the method, similar apparatus (not illustrated) would be carried on a second aircraft in the vicinity. Further, it will be evident that the FIGURE has been simplified by omitting elements not essential to an understanding of the invention, it being deemed obvious to provide instrumentation such as analog-to-digital converters and clock pulse and timing generators. Thus, a monopulse antenna assembly 31, arranged to produce a sum signal and at least an azimuth difference signal (AZ DIFF.) and to be rotated by an antenna drive 33, feeds a correlation receiver 35 and an azimuth difference receiver 37. The output of the correlation receiver 35, when the azimuth difference receiver 37 is nulled, is an indication of dR. The antenna drive 33 also actuates an azimuth position sensor 39 (which sensor may be, for example, conventional "sine-cosine" potentiometers) to produce a signal representative of the azimuth angle of the monopulse antenna assembly 31. The output of the azimuth position sensor 39 is passed through a gate 41 when the output of the azimuth difference receiver 37 is nulled to allow a signal indicative of the angle AZ(1) (FIG. 2) to be passed to a special purpose computer 43. The remaining signals into the special purpose computer 43 are: (a) signals indicative of the angle AZ(2) (FIG. 2) (FIG. 2) and $h(P_2)$ (FIG. 2) from a data link 45; (b) a signal indicative of $h(P_1)$ (FIG. 2) from an altitude sensor 47 of any conventional type; and (c) a signal from an auxiliary radar 49 indicative of the distance ($P_1P_2$ in FIG. 2) between the first and second aircraft (not shown). It will be obvious to one of skill in the art that the special purpose computer 43 may be arranged to solve the equations $$\overline{WP(1)\ WP(2)} = \overline{P_1P_2} \cos(\sin^{-1}(h_2-h_1)/\overline{P_1P_2}) \quad \text{Eq. (2)}$$

and $$\overline{WP(1)\ WP(ss)} = \overline{WP(1)\ WP(2)} \sin AZ(2)/\sin AZ(1)+AZ(2) \quad \text{Eq. (3)}$$

The $h(P_1)$ signal out of the altitude sensor 47 is also fed into a family curve store 51. Such store may be a magnetic tape or banks of registers containing, at different addresses, prerecorded pairs of numbers derived as described hereinbefore in a preload computer 52 to describe families of lines of position. The $h(P_1)$ signal then is the address of each family. The dR signal and the signal out of the azimuth difference receiver 37 are also fed into the family curve store 51. The latter signal, when at a null, enables the dR signal to address a particular curve, i.e. line of position, in any family. Thus, a selected line of position may be extracted from the family curve store and passed to a store 53 that may be a single bank of registers. The addresses of the store 53 are the range portions of the selected line of position. Thus, the desired range (and corresponding altitude) may be obtained by comparing in any conventional way (not shown) the range portions of the selected line of position with the output of the special purpose computer 43. The resulting range and altitude signals are passed to a display 55. Range and altitude signals from aircraft #2 (not shown) are also passed to the display 55.

If the representation on the display 55 does not indicate coincidence then the correlation receiver 35 is adjusted in any convenient manner until coincidence is observed.

It will be noted here that the information used to address the family curve store 51, i.e. the outputs of the altitude sensor 47 and the correlation receiver 35, is the same (along with assumed angles between $R_1D$ and $R_1B$) as that used to calculate a particular desired one of the lines of position stored in the family curve store 51. This suggests that it may be advantageous on occasion to substitute the preload computer 52 for the family curve store 51. Thus, if the number of curves required to be stored is deemed to be excessively large (to attain a desired degree of accuracy regardless of the altitude of point P in FIG. 1), the preload computer 52 (programmed to calculate range and altitude assuming different points of reflection for the indirect path) could be substituted for the family curve store 51. As a result, then, only the relevant line of position would be calculated.

Having described the preferred embodiment of this invention, it will now be apparent that changes may be made without departing from the basic concept of precalculating and storing proper lines of position. It is felt, therefore, that this invention should not be restricted to its disclosed embodiment, but rather should be limited only by the spirit and scope of the appended claims.

What is claimed is:

1. The method of operating monopulse receiving systems on airborne platforms at predetermined altitudes and a known distance from each other to determine the range and altitude of an airborne source of radio frequency signals passing to each one of such systems over a direct and an indirect path, such method comprising the steps of:
   (a) calculating for selected altitudes of a monopulse receiving system and selected values of the difference, dR, between the direct and indirect paths, hyperbolic lines of position, each one of such lines being indicative of the range and altitude of the airborne source for a given altitude of the monopulse receiving system and a given value of dR;
   (b) storing selected values of each one of the lines of position at addressable locations in a store to form sets of pairs of numbers indicative of possible ranges and altitudes of an airborne source, individual pairs of such numbers being addressable by altitude and measured dR in operation;
   (c) scanning the monopulse receiving systems in azimuth until a monopulse null is encountered to determine the azimuth of the airborne source and then (i) calculating the range of such source from each one of such systems, and (ii) measuring the value of dR;
   (d) addressing the stored selected values of the lines of position by the value of h and dR and determining the stored value of altitude of the airborne source at the range determined by step (c); and
   (e) displaying the stored values of range and altitude determined by step (d).

2. The method as in claim 1 wherein the step defined in step (a) includes compensating for curvature of the earth.

3. The method as in claim 2 with the additional steps of repeating steps (a) through (e) at the second monopulse and comparing the displayed values of range and altitude.

4. The method as in claim 3 with the additional step of adjusting one of the monopulse receiving systems until the displays are coincident.

* * * * *